United States Patent
Nishiyama et al.

[11] Patent Number: 5,879,812
[45] Date of Patent: Mar. 9, 1999

[54] MONOLITHIC CERAMIC CAPACITOR AND METHOD OF PRODUCING THE SAME

[75] Inventors: Toshiki Nishiyama, Takefu; Yukio Hamaji, Otsu, both of Japan

[73] Assignee: Murata Manufacturing Co., Ltd., Japan

[21] Appl. No.: 657,997

[22] Filed: Jun. 4, 1996

[30] Foreign Application Priority Data

Jun. 6, 1995 [JP] Japan .................................. 7-139555

[51] Int. Cl.$^6$ .................................................. B32B 17/00
[52] U.S. Cl. ........................ 428/469; 428/472; 428/701; 428/702; 361/321.4; 361/321.5
[58] Field of Search .............................. 361/321.4, 321.5; 428/469, 472, 701, 702

[56] References Cited

U.S. PATENT DOCUMENTS

| | | | |
|---|---|---|---|
| 4,467,396 | 8/1984 | Leupold | 361/321.5 |
| 4,482,934 | 11/1984 | Hirota | 361/321 |
| 4,833,000 | 5/1989 | Trickett et al. | 428/137 |
| 4,935,844 | 6/1990 | Burn | 361/321 |
| 5,036,425 | 7/1991 | Omori et al. | 361/321 |
| 5,117,326 | 5/1992 | Sano et al. | 361/321 |
| 5,411,563 | 5/1995 | Yeh et al. | 65/17.3 |
| 5,459,635 | 10/1995 | Tomozawa | 361/321.5 |
| 5,672,220 | 9/1997 | Omori | 156/89 |

FOREIGN PATENT DOCUMENTS

| | | |
|---|---|---|
| 0275052 | 7/1988 | European Pat. Off. . |
| 0690462 | 1/1996 | European Pat. Off. . |

*Primary Examiner*—Timothy M. Speer
*Attorney, Agent, or Firm*—Ostrolenk, Faber, Gerb & Soffen, LLP

[57] ABSTRACT

Disclosed is a monolithic ceramic capacitor composed of plural dielectric ceramic layers made of a ceramic material comprising strontium titanate and bismuth oxide or the like, plural inner electrodes made of a base metal material comprising nickel or a nickel alloy, which are laminated via the dielectric ceramic layer to produce the electrostatic capacity of the capacitor, and outer electrodes as electrically connected with the inner electrodes. Each dielectric ceramic layer in the capacitor contains a reduction inhibitor, for example $aMO+bMnO_2+cB_2O_3+(100-a-b-c)SiO_2$ (where M is at least one of Mg, Sr, Ca and Ba; and a, b and c each are, in % by mol, $10 \leq a \leq 60$, $5 \leq b \leq 20$ and $20 \leq c \leq 35$). In producing the capacitor, the laminate of dielectric ceramic layers may be fired in a neutral or reducing atmosphere without being reduced.

5 Claims, No Drawings

MONOLITHIC CERAMIC CAPACITOR AND METHOD OF PRODUCING THE SAME

BACKGROUND OF THE INVENTION

1. Field of the Invention

The present invention relates to a monolithic ceramic capacitor and a method of producing it. More particularly, the present invention relates to a monolithic ceramic capacitor having dielectric ceramic layers each made of a ceramic material comprising strontium titanate as the main component and bismuth oxide or an oxide of a bismuth compound as an additional component and containing a reduction inhibitor, and also to a method of producing it.

2. Description of Related Art

A monolithic ceramic capacitor is generally composed of a plurality of dielectric ceramic layers with inner electrodes sandwiched between the adjacent ceramic layers and with outer electrodes disposed on the outer surface of the laminate and connected with each inner electrode.

Such a monolithic ceramic capacitor may be produced according to the following process. A dielectric powder is mixed with an organic binder; the resulting mixture is made into a slurry; the slurry is shaped into green sheets by a doctor-blading method; the sheets each are printed with a paste containing a metal powder by a screen-printing method or the like; a plurality of the green sheets each printed with the paste are laminated; the resulting laminate is subjected to pressure to establish tight connections between the green sheets; the laminate is then fired in air at from about 1300° to 1400° C.; an outer electrode material is applied onto the surfaces of the sintered body having exposed inner electrodes; and the material is baked.

Dielectric ceramic layers consisting essentially of strontium titanate and containing a bismuth compound give the monolithic ceramic capacitor a relatively large dielectric constant with small voltage dependence and a small dielectric loss and therefore high resistance to high voltage.

A material of the inner electrodes comprising a noble metal such as platinum, gold, palladium or their alloys is advantageous in that (1) the inner electrode material does not react with the dielectric ceramic during firing since the noble metal has a melting point higher than the temperature at which the dielectric ceramic is fired and that (2) the inner electrode material is not oxidized even when fired in air. However, an electrode material comprising such a noble metal is expensive. For example, the cost of the electrode material may often be from 30 to 70% of the total material cost of the ceramic capacitor.

Moreover, an inner electrode material comprising a silver-palladium alloy often worsens the characteristics of the capacitor. For example, the dielectric constant of the capacitor is often lowered and becomes unstable due to the migration of silver.

In order to solve these problems, base metals such as nickel, copper, iron, cobalt, tungsten, molybdenum, etc. could be used as the inner electrode material. However, the material comprising such a base metal must be fired in a neutral or reducing atmosphere in order to prevent the oxidation of the material during firing. If fired in such conditions, the bismuth compound in the dielectric ceramic layers is reduced and, as a result, the dielectric ceramic becomes semi-conductive. Accordingly, a ceramic capacitor would not be produced.

Copper can be fired at about 1000° C. in a neutral atmosphere having an oxygen partial pressure of $10^{-7}$ MPa but it is easily oxidized at relatively low temperatures. An inner electrode material comprising copper also diffuses copper into the dielectric ceramic layers during firing at an oxygen partial pressure that is higher than the equilibrated oxygen partial pressure of Cu/CuO and often lowers the characteristics of the capacitor produced. Therefore, an inner electrode material comprising copper requires the strict control of the oxygen partial pressure in the firing atmosphere, which, however, results in the increase in the production cost.

SUMMARY OF THE INVENTION

The present invention provides a monolithic ceramic capacitor which comprises a dielectric ceramic material consisting of strontium titanate as the main component and bismuth oxide or an oxide of a bismuth compound as an additional component and an inner electrode material of a base metal and which therefore has a large dielectric constant with small voltage dependence and a small dielectric loss and has high resistance to high voltage.

Specifically, as the first aspect of the present invention, there is provided a monolithic ceramic capacitor which is composed of dielectric ceramic layers made of a ceramic material comprising strontium titanate as the main component and bismuth oxide or an oxide of a bismuth compound as an additional component and containing a reduction inhibitor, and inner electrodes made of a base metal material containing nickel or a nickel alloy.

As one preferred embodiment of the first aspect of the invention, the reduction inhibitor in the ceramic material is represented by a general formula:

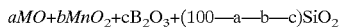

$$aMO + bMnO_2 + cB_2O_3 + (100-a-b-c)SiO_2$$

wherein M is at least one of Mg, Sr, Ca and Ba; and a, b and c are $10 \leq a \leq 60$, $5 \leq b \leq 20$ and $20 \leq c \leq 35$ in mol percent.

As another preferred embodiment, the reduction inhibitor is from about 4 to 25% by weight relative to the ceramic material containing it.

The present invention also provides as its second aspect a method for producing a monolithic ceramic capacitor, which comprises the steps of preparing dielectric ceramic green sheets and laminating an electrode material on each green sheet to form a laminate comprising the ceramic green sheets each with the electrode material, followed by heating the resulting laminate at a rate to realize an increase in the temperature of the laminate of from about 10° to 17° C./min, firing it at a predetermined temperature and thereafter cooling it.

As one preferred embodiment of the second aspect of the invention, the laminate is cooled at a rate of about 10° C./min or more in the last cooling step.

As another preferred embodiment, the ceramic green sheets prepared comprise strontium titanate as a main component and bismuth oxide or an oxide of a bismuth compound as a minor component and contain a reduction inhibitor as an additive.

As still another preferred embodiment, the electrode material laminated to be on each ceramic green sheet comprises a base metal material containing nickel or a nickel alloy.

As still another preferred embodiment, the reduction inhibitor in each ceramic green sheet is represented by a general formula:

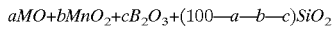

$$aMO + bMnO_2 + cB_2O_3 + (100-a-b-c)SiO_2$$

wherein M is at least one of Mg, Sr, Ca and Ba; and a, b and c are 10≦a≦60, 5≦b≦20 and 20≦c≦35 in % by mol.

DETAILED DESCRIPTION OF THE INVENTION

The preferred reduction inhibitor is of the general formula:

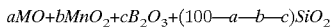
$$aMO+bMnO_2+cB_2O_3+(100-a-b-c)SiO_2$$

wherein M is at least one of Mg, Sr, Ca and Ba; and a, b and c each are % by mol. It contains a reduction inhibitor MO. If MO is less than about 10 mol % of the reduction inhibitor, the insulating resistance of the ceramic capacitor is lowered and the dielectric loss thereof is increased. If it is more than about 60 mol %, the insulating resistance of the ceramic capacitor is also lowered. Therefore, the mol % (a) of MO in the reduction inhibitor preferably satisfies 10≦a≦60 and most preferably 35≦a≦55.

Also, $MnO_2$ functions as a reduction inhibitor. If b is less than about 5 mol %, the dielectric ceramic becomes semi-conductive. If it is more than about 20 mol %, the insulating resistance of the ceramic capacitor is lowered. Therefore, it is desirable that 5≦b≦20 and most preferably 10≦b≦15.

$B_2O_3$ functions as a glass former. If c is less than about 20 mol %, the green sheets cannot be sintered sufficiently. Therefore, the dielectric loss of the ceramic capacitor is increased and the insulating resistance thereof is lowered. If c is more than about 35 mol %, the dielectric constant of the ceramic capacitor is lowered. Therefore, it is desirable that 20≦c≦35 and most preferably 25≦c≦30.

$SiO_2$ functions as a glass former. If a, b and c are outside the ranges of 10≦a≦60, 5≦b≦20 and 20≦c≦35, the insulating resistance of the ceramic capacitor is lowered, the dielectric loss thereof is increased and the dielectric constant thereof is lowered.

If the amount of the reduction inhibitor added to the dielectric ceramic material is less than about 4% by weight, it is difficult to prevent reduction of the dielectric material. If, however, it is more than about 25% by weight, the dielectric constant of the ceramic capacitor is noticeably lowered. Therefore, it is preferable that the monolithic ceramic capacitor of the present invention contains from about 4 to 25% by weight of the reduction inhibitor relative to the dielectric ceramic material and more preferably about 8 to 20%.

The firing temperature of the ceramic is conventional. However, in the method of the present invention for producing the dielectric ceramic, when the heating rate to firing temperature is lower than about 10° C./min, the dielectric ceramic becomes semi-conductive. If, however, it is higher than about 17° C./min, the green sheets cannot be sintered sufficiently. If the heating rate is lower than about 10° C./min and the cooling rate for cooling the sintered body is lower than about 10°/min, the dielectric ceramic also becomes semi-conductive. Therefore, in the method of the present invention for producing the dielectric ceramic, it is preferable that the heating rate for heating the laminate is at from about 10° to 17° C./min, preferably about 15° to 17° C./min, and that the cooling rate for cooling the sintered body is about 10° C./min or higher, preferably about 15° to 17° C./min.

Since a dielectric ceramic material containing a reduction inhibitor is used to produce the monolithic ceramic capacitor of the present invention, the bismuth compound in the dielectric ceramic material is not reduced even when the material is fired in a neutral or reducing atmosphere. According to the present invention, it is therefore possible to obtain a monolithic ceramic capacitor having a high dielectric constant with small voltage dependence and having a low dielectric loss.

In addition, since the monolithic ceramic capacitor of the present invention can be produced by firing in a neutral or reducing atmosphere, an inner electrode material comprising nickel or a nickel alloy can be used and is not oxidized. The nickel does not migrate like silver does when used to make inner electrodes.

Accordingly, the present invention can provide monolithic ceramic capacitors with excellent characteristics at low cost.

In the method of the present invention for producing a monolithic ceramic capacitor, the heating rate for heating the ceramic laminate is from about 10° to 17° C./min and the cooling rate for cooling the sintered ceramic body is about 10° C./min or higher. Therefore, the method can produce monolithic ceramic capacitors with excellent characteristics while preventing the inner electrodes from being oxidized and preventing the dielectric ceramic layers from becoming semi-conductive.

In addition, even when nickel or a nickel alloy is used as the inner electrode material in the method, the nickel is not oxidized when firing under an oxygen partial pressure higher than the equilibrated oxygen partial pressure of Ni/NiO.

Examples of the present invention are mentioned below, which, however, are not intended to restrict the scope of the invention.

EXAMPLE 1

Dielectric raw materials $SrCO_3$, $Pb_3O_4$, $CaCO_3$, $Bi_2O_3$, $SnO_2$ and $TiO_2$ were prepared and weighed to obtain a dielectric substance which was 36.9 $SrTiO_3$+26.4 $PbTiO_3$+ 19.5 $CaTiO_3$+4.3 $Bi_2O_3$+1.8 $SnO_2$+11.1 $TiO_2$, and wet-milled in a ball mill for 16 hours. The resulting mixture was dried through vaporization to a powder, and the powder was calcined in an alumina box at from 900° to 950° C. for 2 hours. The calcined body was ground into a powder having a mean particle size of 1 μm. Thus was obtained a calcined dielectric powder.

Next, the raw materials for the reduction inhibitor, MgO, BaO, SrO, CaO, $MnO_2$, $B_2O_3$ and $SiO_2$ were prepared and weighed to obtain a mixture of a general formula, $aMO+bMnO_2+cB_2O_3+(100-a-b-c)SiO_2$ (where M is at least one selected from Mg, Sr, Ca and Ba; a, b and c are % by mol and falls within the ranges of 10≦a≦60, 5≦b≦20 and 20≦c≦35) as set forth in Table 1 below. The resulting mixture was wet-milled in a ball mill and then dried through vaporization. This was then heated and melted in an alumina crucible at 1300° C. The resulting melt was rapidly cooled to cause the melt to become vitrified and then ground into powder having a mean particle size of 1 μm.

The calcined dielectric powder and the reduction inhibitor obtained above were mixed at the ratios shown in Table 1, and a polyvinyl butyral binder, ethanol and toluene were added. The resulting mixture was wet-milled in a ball mill for 16 hours to form a slurry. The resulting slurry was shaped into a sheet by the doctor-blading method, dried and then cut into a predetermined size. Thus was obtained a ceramic green sheet. A nickel paste was applied to one main surface of the thus-obtained ceramic green sheet by the screen-printing method. A plurality of the thus-printed ceramic green sheets were laminated under pressure to obtain a laminate.

The resulting laminate was heated in air at 300° C. to remove the binder therefrom and then fired in a mixed gas atmosphere comprising $N_2$, $H_2$ and $H_2O$ and having a partial oxygen pressure of from $10^{-6}$ to $10^{-10}$ MPa at from 850° to 1050° C. for 2 hours to obtain a sintered body. During the firing, the laminate was heated up to the highest temperature at a rate of from 10° to 17° C./min. After having been thus fired, the sintered body was cooled at a rate of 10° C./min or higher.

A silver paste was applied to the both edges of the sintered body and baked thereon to form external electrodes electrically connected with the internal electrodes. Thus was obtained a monolithic ceramic capacitor. This had a thickness of 30 μm.

The dielectric constant ε at room temperature, the dielectric loss tan δ at room temperature, the temperature coefficient of capacity TCC and the DC bias characteristic of the thus-obtained monolithic ceramic capacitor were measured. The data obtained are shown in Table 1, in which the samples marked with * are outside the scope of the present invention and the other samples are within the scope thereof.

The dielectric constant ε and the dielectric loss tan δ were measured at a temperature of 25° C., a frequency of 1 kHz and a voltage of AC 1 V. The temperature coefficient of capacity TCC indicates the temperature-dependent characteristic of the capacitor as stipulated by the JIS Standard. The DC bias characteristic indicates the variation in the electrostatic capacity of the monolithic ceramic capacitor to which was applied a direct current voltage of 2 kV/mm.

of their dielectric constant is large. Therefore, these samples are not applicable to monolithic ceramic capacitors.

EXAMPLE 2

In the same manner as in Example 1, raw materials were prepared and weighed to produce a mixture of a general formula, $uSrTiO_3+vPbTiO_3+wCaTiO_3+xBi_2O_3+ySnO_2+zTiO_2$ (where u, v, w, x, y and z are the values in Table 2 below). The resulting mixture was wet-milled and ground in a ball mill, dried through vaporization and thereafter calcined. The calcined body was dry-ground and sieved to obtain a calcined powder.

Next, also in the same manner as in Example 1, raw materials for reduction inhibitors were prepared and weighed to produce a mixture of the chemical formula 10 $MgO+15$ $SrO+10$ $CaO+15$ $BaO+10$ $MnO_2+25$ $B_2O_3+15$ $SiO_2$ (mol %). The resulting mixture was wet-milled and ground in a ball mill, dried through vaporization and then fully melted under heat at 1300° C. in an alumina crucible. The resulting melt was rapidly cooled to be vitrified and then ground into powder having a mean particle size of 1 μm.

The calcined dielectric powder and the reduction inhibitor thus prepared were mixed at the ratios shown in Table 2. Using the thus-obtained mixture, a monolithic ceramic capacitor was produced in the same manner as in Example 1, and its electric characteristics were measured also in the same manner as in Example 1. The data obtained are shown

TABLE 1

| Sample No. | Titanate Plus Bi w % | Reduction Inhibitor w % | Composition of Reduction Inhibitor, mol % | | | | | | | Firing Temperature °C. | Electric characteristics | | | | |
|---|---|---|---|---|---|---|---|---|---|---|---|---|---|---|---|
| | | | a | | | | b | c | 100 − 1 − b − c | | Dielectric Constant ε | Dielectric Loss Tan δ | Insulating Resistance Ω · cm | DC % | TCC JIS |
| | | | MgO | BaO | SrO | CaO | | | | | | | | | |
| 1 | 96 | 4 | 5 | 15 | 15 | 10 | 10 | 25 | 20 | 1000 | 2000 | 0.4 | $\geq 10^{10}$ | +4 | C |
| 2 | 96 | 4 | 5 | 40 | 0 | 0 | 10 | 25 | 20 | 1050 | 2100 | 0.5 | $\geq 10^{10}$ | +3 | C |
| 3 | 96 | 4 | 5 | 10 | 15 | 15 | 10 | 25 | 20 | 1000 | 1950 | 0.3 | $\geq 10^{10}$ | +5 | C |
| 4 | 96 | 4 | 5 | 15 | 15 | 20 | 15 | 20 | 10 | 1050 | 2150 | 0.5 | $\geq 10^{10}$ | +2 | C |
| 5 | 96 | 4 | 5 | 15 | 15 | 20 | 15 | 30 | 0 | 950 | 1900 | 0.3 | $\geq 10^{10}$ | +2 | B |
| 6 | 92 | 8 | 0 | 15 | 10 | 10 | 15 | 30 | 20 | 950 | 1750 | 0.2 | $\geq 10^{10}$ | +1 | B |
| 7 | 88 | 12 | 0 | 15 | 10 | 10 | 15 | 30 | 20 | 950 | 1400 | 0.1 | $\geq 10^{10}$ | +1 | B |
| 8 | 84 | 16 | 0 | 15 | 10 | 10 | 15 | 30 | 20 | 920 | 1150 | 0.1 | $\geq 10^{10}$ | 0 | B |
| 9 | 80 | 20 | 0 | 15 | 10 | 10 | 15 | 30 | 20 | 880 | 950 | 0.08 | $\geq 10^{10}$ | −1 | B |
| 10 | 75 | 25 | 0 | 15 | 10 | 10 | 15 | 30 | 20 | 850 | 750 | 0.06 | $\geq 10^{10}$ | −1 | B |
| 11* | 70 | 30 | 0 | 15 | 10 | 10 | 15 | 30 | 20 | 850 | 630 | 0.09 | $\geq 10^{10}$ | 0 | B |
| 12* | 100 | 0 | 0 | 0 | 0 | 0 | 0 | 0 | 0 | 1080 | Measurement Impossible | | | | |
| 13* | 96 | 4 | 0 | 0 | 0 | 5 | 20 | 35 | 40 | 1000 | 1900 | 1.4 | $10^9$ | +3 | C |
| 14* | 96 | 4 | 5 | 2 | 15 | 20 | 0 | 35 | 5 | 1000 | Measurement Impossible | | | | |
| 15* | 96 | 4 | 0 | 15 | 15 | 20 | 25 | 20 | 5 | 950 | 2050 | 0.9 | $10^9$ | +2 | C |
| 16* | 96 | 4 | 5 | 20 | 15 | 20 | 20 | 15 | 5 | 1080 | 830 | 1.2 | $10^9$ | 0 | B |
| 17* | 96 | 4 | 0 | 15 | 15 | 20 | 5 | 40 | 5 | 950 | 510 | 0.9 | $10^{10}$ | +1 | B |
| 18* | 96 | 4 | 5 | 40 | 10 | 10 | 5 | 20 | 10 | 1000 | 940 | 0.8 | $10^9$ | −2 | C |

From Table 1 above, it is seen that the samples not containing the reduction inhibitor have a high dielectric loss and a low insulating resistance while the voltage dependence in Table 2, in which the samples with (*) are outside the scope of the present invention and the other samples are within the scope thereof.

TABLE 2

| Sample No. | Composition of Dielectric $uSrTiO_3 + vPbTiO_3 + wCaTiO_3 + xBi_2O_3 + ySnO_2 + zTiO_2$ mol % | | | | | | Titnate Plus Bi Wt % | Reduction Inhibitor Wt % | Firing Temperature °C. | Electric Characterics | | | | |
|---|---|---|---|---|---|---|---|---|---|---|---|---|---|---|
| | u | v | w | x | y | z | | | | Dielectric Constant $\epsilon$ | Dielectric Loss Tan $\delta$ | Insulating Resistance $\Omega \cdot cm$ | DC % | TCC JIS |
| 20 | 42.2 | 28.1 | 12.4 | 4.3 | 4.4 | 8.6 | 96.0 | 4.0 | 1050 | 5200 | 0.7 | $\geq 10^{10}$ | −23 | D |
| 21 | 48.8 | 21.5 | 12.4 | 4.3 | 4.4 | 8.6 | 96.0 | 4.0 | 1020 | 2050 | 0.1 | $\geq 10^{10}$ | −7 | C |
| 22 | 43.4 | 28.6 | 15.2 | 2.8 | 2.8 | 7.2 | 96.0 | 4.0 | 1020 | 1700 | 0.3 | $\geq 10^{10}$ | −15 | D |
| 23 | 38.9 | 25.9 | 11.4 | 6.7 | 13.3 | 3.8 | 96.0 | 4.0 | 1000 | 1800 | 0.4 | $\geq 10^{10}$ | −5 | C |
| 24 | 42.2 | 28.1 | 12.4 | 4.3 | 4.4 | 8.6 | 92.0 | 8.0 | 1000 | 4200 | 0.5 | $\geq 10^{10}$ | −16 | C |
| 25 | 48.8 | 21.5 | 12.4 | 4.3 | 4.4 | 8.6 | 92.0 | 8.0 | 950 | 1450 | 0.05 | $\geq 10^{10}$ | −4 | B |
| 26 | 43.4 | 28.6 | 15.2 | 2.8 | 2.8 | 7.2 | 92.0 | 8.0 | 950 | 1100 | 0.2 | $\geq 10^{10}$ | −11 | B |
| 27 | 38.9 | 25.9 | 11.4 | 6.7 | 13.3 | 3.8 | 92.0 | 8.0 | 950 | 1150 | 0.2 | $\geq 10^{10}$ | −3 | B |
| 28 | 42.2 | 28.1 | 12.4 | 4.3 | 4.4 | 8.6 | 88.0 | 12.0 | 920 | 2850 | 0.4 | $\geq 10^{10}$ | −11 | B |
| 29 | 48.8 | 21.5 | 12.4 | 4.3 | 4.4 | 8.6 | 88.0 | 12.0 | 900 | 1000 | 0.1 | $\geq 10^{10}$ | −2 | B |
| 30 | 43.4 | 28.6 | 15.2 | 2.8 | 2.8 | 7.2 | 88.0 | 12.0 | 900 | 850 | 0.2 | $\geq 10^{10}$ | −8 | B |
| 31 | 38.9 | 25.9 | 11.4 | 6.7 | 13.3 | 3.8 | 88.0 | 12.0 | 960 | 900 | 0.1 | $\geq 10^{10}$ | −2 | B |

As shown in Table 1 and Table 2, the monolithic ceramic capacitor samples of the present invention have a high insulating resistance of $10^{10}$ $\Omega$.cm or more and a relatively high dielectric constant with small voltage dependence while having a small dielectric loss.

The nickel or silver paste used as the material for the inner electrodes and the outer electrodes in Example 1 and Example 2 were prepared by adding a ethyl cellulose varnish to a nickel or silver powder having a particle size of from 0.5 to 5 $\mu$m followed by dispersing the resulting powder in a solvent such as a-terpineol or the like. Preferably, the inner electrodes have a thickness of from 0.5 to 5 $\mu$m and the outer electrodes have a thickness of from 10 to 80 $\mu$m.

EXAMPLE 3

The laminate for sample No. 1 in Example 1 was fired at varying heating rates and varying cooling rates as in Table 3 below. The electric characteristics of the monolithic ceramic capacitor samples obtained herein were measured and shown in Table 3, in which the samples with (*) are outside the scope of the present invention and the other samples are within the scope thereof.

EXAMPLE 4

Monolithic ceramic capacitor samples were produced in the same manner as in Example 1 except that a nickel alloy paste having a composition of 10Cr-90Ni (atm.%) was used as the metal paste for the inner electrodes in place of the nickel paste in Example 1. The electric characteristics of the samples obtained were measured in the same manner as in Example 1.

As a result, it was confirmed that the nickel alloy paste produced the same characteristics as those which the nickel paste produced.

Apart from the dielectric powders as illustrated hereinabove, for example, also employable are $SrTiO_3+MgTiO_3+Bi_2O_3+TiO_2+Pb_3O_4$ illustrated in JP-B-59-8923, $SrTiO_3+CaTiO_3+Bi_2O_3.nTiO_2$ in Japanese Patent Laid-Open No. 59-20908, and $SrTiO_3+Bi_2O_3+TiO_2+NiO$ in JP-A-60-145951, for example.

Oxides of MgO, BaO, SrO, CaO, $MnO_2$, $B_2O_3$ and $SiO_2$ were used hereinabove as the raw materials for reduction inhibitors. In addition to these, however, the corresponding carbonates and hydroxides can also be employed.

Nickel or nickel alloys were used as the raw materials for

TABLE 3

| Sample No. | Heating Rate °C./min | Cooling Rate °C./min | Firing Temperature °C. | Electric Characteristics | | | | |
|---|---|---|---|---|---|---|---|---|
| | | | | Dielectric Constant | Dielectric Loss | Insulating Resistance | DC % | TCC JIS |
| 34* | 3.3 | 3.3 | 1000 | 1200 | 3.9 | $10^8$ | +2 | C |
| 35* | 10 | 3.3 | 1000 | 1550 | 3.2 | $10^8$ | +1 | C |
| 36* | 15 | 3.3 | 1000 | 1600 | 2.9 | $10^8$ | +3 | C |
| 37* | 17 | 3.3 | 1000 | 2350 | 2.8 | $10^8$ | +2 | C |
| 38* | 18 | 3.3 | 1050 | 2500 | 3.4 | $10^8$ | +3 | C |
| 39* | 8 | 10 | 1000 | 2300 | 2.9 | $10^8$ | +2 | C |
| 41 | 10 | 10 | 1000 | 2000 | 0.3 | $\geq 10^{10}$ | +3 | C |
| 42 | 15 | 10 | 980 | 1900 | 0.2 | $\geq 10^{10}$ | +2 | C |
| 43 | 17 | 10 | 1050 | 1950 | 0.3 | $\geq 10^{10}$ | +3 | C |
| 44* | 18 | 10 | 1000 | 2400 | 3.6 | $10^8$ | +1 | C |
| 45 | 10 | 15 | 1000 | 1870 | 0.2 | $\geq 10^{10}$ | +1 | C |
| 46 | 10 | 17 | 980 | 1900 | 0.3 | $\geq 10^{10}$ | 0 | C |

If the heating rate and the cooling rate are too low in preparing the inner electrodes, the inner electrodes produced are oxidized with the result that the insulating resistance of the capacitor is lowered and the dielectric loss is enlarged.

inner electrodes. In addition to these, however, nickel or nickel alloys to which at least one of the raw materials for dielectric powders and the raw materials for inner electrodes has been added can also be employed.

Various additives such as manganese oxide, iron oxide, silicon oxide, glass, etc. can be added to the materials for the monolithic ceramic capacitor of the present invention, so far as they do not detract from the characteristics of the capacitor produced.

Where nickel alloy pastes are used, it is desirable that the metals other than nickel in the pastes are selected without noticeably detracting from the characteristics of the capacitors to be produced, as compared with those of the capacitors comprising pure nickel, since the electroconductivity and the melting point of nickel alloys often vary depending on the kind of the additional metal and the amount thereof. Accordingly, the composition of the nickel alloy paste to be used can be modified depending on the intended use of the monolithic ceramic capacitor to be produced and on the compositions of the dielectric powder and the reduction inhibitor to be used.

The materials for outer electrodes may be the same as those for inner electrodes. Silver, palladium, silver palladium alloys, etc., are also employable. In any case, materials suitable for use in laminate ceramic capacitor of the present invention are selected.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising:

a plurality of superposed dielectric ceramic layers made of a ceramic material comprising strontium titanate and bismuth oxide and a reduction inhibitor, and a plurality of base metal inner electrodes comprising non-oxidized nickel or nickel alloy, each of which is disposed between adjacent dielectric ceramic layers wherein the reduction inhibitor is represented by the general formula:

$aMO+bMnO_2+cB_2O_3+(100-a-b-c)SiO_2$ in which M is at least one of Mg, Sr, Ca and Ba; and a, b and c are $10 \leq a \leq 60$, $5 \leq b \leq 20$ and $20 \leq c \leq 35$ in % by mol.

2. The monolithic ceramic capacitor according to claim 1, in which the reduction inhibitor is in an amount of from about 4 to 25% by weight relative to the ceramic material.

3. The monolithic ceramic capacitor according to claim 2, wherein $35 \leq a \leq 55$, $10 \leq b \leq 15$ and $25 \leq c \leq 30$ in % by mol.

4. The monolithic ceramic capacitor according to claim 3, in which the reduction inhibitor is in an amount of from about 8 to 20% by weight relative to the ceramic material.

5. The monolithic ceramic capacitor according to claim 1, in which the reduction inhibitor is in an amount of from about 8 to 20% by weight relative to the ceramic material.

* * * * *